United States Patent [19]
Lefevre et al.

[11] 3,781,694
[45] Dec. 25, 1973

[54] ELECTRONIC CIRCUIT FOR PREDETERMINING THE AMPLITUDE OF SAMPLES OF ANALOGUE SIGNALS

[75] Inventors: Georges Lefèvre, Nantes; Jean Paul Ménard, St Crespin Sur Moine, both of France

[73] Assignee: Societe d'Etudes, Recherches et Constructions Electroniques (S.E.R.C.E.L.), Carquefou, France

[22] Filed: Oct. 28, 1971

[21] Appl. No.: 193,287

[30] Foreign Application Priority Data

Nov. 6, 1970 France .............................. 7040039

[52] U.S. Cl. .................. 328/150, 307/330, 328/151
[51] Int. Cl. .............................................. H03k 5/20
[58] Field of Search ........................... 328/150, 151; 307/330

[56] References Cited

UNITED STATES PATENTS 3,119,984 1/1964 Brandt et al. .................. 328/151 X
3,207,998 9/1965 Corney et al. ................. 328/151 X

OTHER PUBLICATIONS

Reference Data for Radio Engineers, 3rd edition, 1949, Federal Telephone and Radio Corporation, pg. 538.

*Primary Examiner*—John Zazworsky
*Attorney*—Alan H. Levine

[57] ABSTRACT

An electronic circuit has a transfer function of $1 + \tau p$, $p$ being the Laplace variable, and $\tau$ a time constant at least equal to the time which separates a characteristic instant of the logical treatment of the samples from the instant of their being stored. This circuit is inserted upstream of the logical processing circuits, and downstream of the point where the samples are taken with a view to being stored.

The circuit has utility with sample amplifiers having automatic gain regulation.

3 Claims, 4 Drawing Figures

Inventors:
GEORGE LEFEVRE
JEAN PAUL MENARD
By Breitenfeld & Levine
Attorneys

Inventors:
GEORGE LEFEVRE
JEAN PAUL MENARD
By
Breitenfeld & Levine
Attorneys

ELECTRONIC CIRCUIT FOR PREDETERMINING THE AMPLITUDE OF SAMPLES OF ANALOGUE SIGNALS

The present invention relates to the processing of samples of analogue signals.

It will be recalled that an analogue signal sample is a portion cut-out from this analogue signal, framed by a signal of negligible amplitude on each side. If the samples are to preserve the information carried by the analogue signal, the duration of each sample is chosen to be less than one-half the period of the maximum frequency component of the analogue signal and the sampling frequency has to be at least equal to twice the frequency of the maximum frequency component of the analogue signal. Under these conditions, the amplitude of the successive samples, stored at a given instant of each sample, is a faithful image of the original analogue signal. However, it must not be lost from sight that, if such an amplitude stored is a constant signal, the sample itself is capable of variations which can be large.

When such samples are used to effect a logical processing, comprising for example comparisons followed by decisions finding expression in modifications on the sample before its storing, there necessarily elapses a certain time between the comparisons, the decisions, and the storing of the modified sample. The amplitude of the analogue signal of each sample can therefore have varied during this time. The comparisons and the decisions therefore lead, in certain cases, to modifications of the sample which are no longer valid at the moment of the storing.

A precise example will allow the problem posed to be better understood. In U.S. Pat. No. 3,559,180, the applicant has described an amplifier for samples associated with an analogue to digital converter.

The sample amplifier is capable of selecting automatically by means of comparisons and decisions, an amplification factor from amongst a certain number of discrete values. This selection is effected so as to bring the samples into the vicinity of the amplitude allowing the maximum precision of measurement of the converter.

When the samples vary very rapidly, the aforesaid interval of time between the choice of the amplification factor and the storing of the amplified sample gives rise to a big variation between the amplitude of the amplified sample stored and the amplitude which has presided at the choice of the amplification factor. In this case, two disastrous consequences can occur. Either the sample stored is too big, in which case the measurement made by the converter is devoid of meaning; or the sample stored has become too small, and the measurement made by the converter is exact, but does not have the maximum precision which one can expect of the converter.

The present invention relates to electronic circuits which allow these disadvantages to be obviated. These circuits are particularly suitable for correcting the aforesaid errors in sample amplifiers having automatic regulation of the amplification factor.

Such a circuit allows the optimum value of the amplification factor to be defined by referring to what the magnitude of the sample will be at the instant when it is stored; its function is therefore to determine the amplitude of the samples stored.

Such a circuit is therefore connected in series upstream of the circuits effecting the logical processing, but downstream of the point where the sample is taken with a view to its storing.

It has already been said that the duration of the samples is small when compared with the period of the highest frequency component of the analogue signals sampled. It is therefore possible to represent the variations of the analogue signal of one and the same sample as a linear variation. If it is assumed that the definition of the gain applicable to a sample takes place at an instant $t_1$ of this sample, and the storing at an instant $t_2$ of the same sample, the variation of the sample between these two instants is proportional to the difference $t_2 - t_1$, which will be called $\tau$ hereinafter. The coefficient of proportionality is the derivative of the analogue signal at any instant whatever of the sample if one assumes that its variation is linear. Preferably the value of the derivative will be taken at the instant $t_1$, which is noted: $(dv/dt)t_1$.

If $v_1$ is the amplitude of the analogue signal at the instant $t_1$, and $v_2$ the amplitude of the analogue signal which it is desired to predetermine at the instant $t_2$, this value $v_2$ sought is given by the relation: $v_2 = v_1 + (dv/dt)t_1\,\tau$.

The corresponding transfer function expressed by means of the Laplace variable, $p$, is therefore written:

$$1 + \tau p.$$

The time constant $\tau$ is advantageously obtained by means of a quadripole comprising at least one resistor R and a capacitor C. Examples of such quadripoles will be given hereinafter.

This time constant $\tau$ is preferably chosen at least equal to the interval of time which separates a characteristic instant of the logical processing of the samples from the instant whose amplitude has to be predetermined (instant of storing, generally).

The invention also relates to devices for processing analogue signals, and more especially sample amplifiers having an amplification factor adjustable in an automatic manner equipped with at least one circuit in accordance with the invention.

Other features and advantages of the invention will emerge when reading the following description, made with reference to the attached drawings, given by way of non-restrictive example, and in which.

Figure 1:
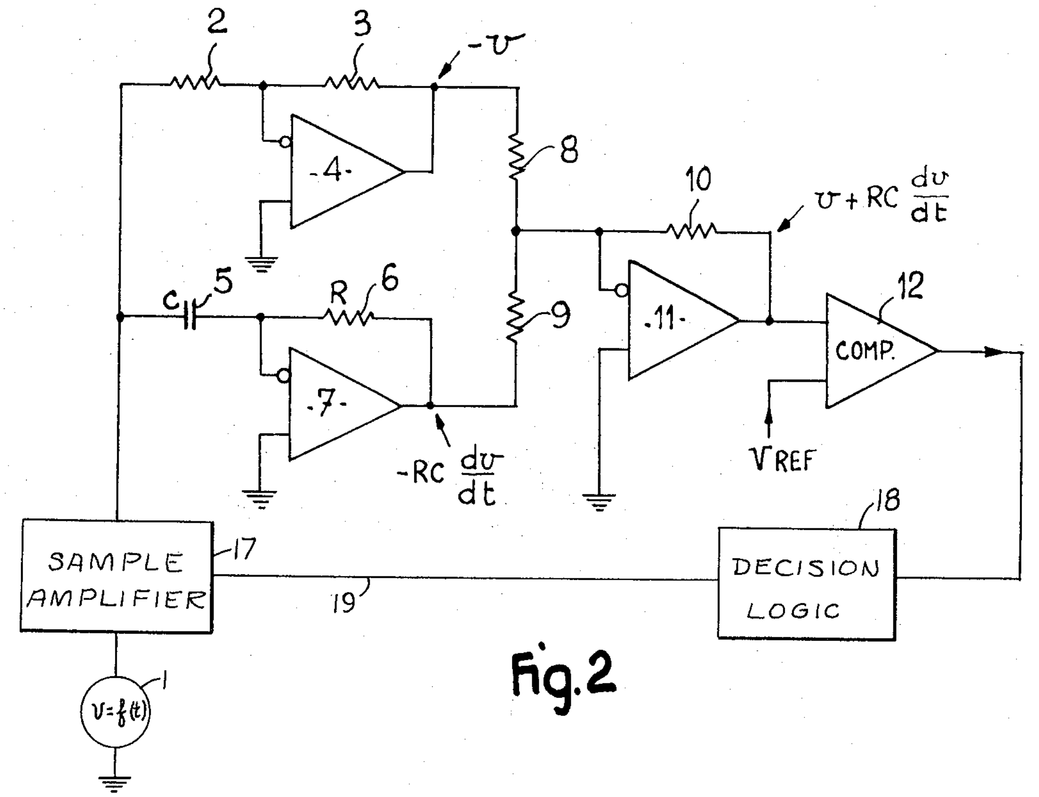
FIG. 1 is an electrical diagram of one embodiment of the circuit, in accordance with the invention, using operational amplifiers.

FIG. 1 comprises a generator 1 of the sampled signal $v = f(t)$ connected to a sample amplifier 17 such as are more fully described hereinafter. A signal proportional to f(t) is supplied by amplifier 17, via a resistor 2, at the inverting input of an operational amplifier 4 whose other input is grounded. This amplifier is provided, between its output and the inverting input, with a negative feedback resistor 3 of value equal to that of the resistor 2. The result is that the output signal of the amplifier 4 is $v$.

The signal supplied by the sample amplifier 17 is transmitted also via a capacitor C, of reference 5, to the inverting input of a second operational amplifier 7 whose other input is also grounded, and which is provided between its output and its input with a negative feedback resistor R, of reference 6. The output signal of the operational amplifier 7 is therefore:

$$-RC\,(dv/dt).$$

The output signals of the operational amplifiers 4 and 7 are transmitted respectively by resistors 8 and 9 to the inverting input of a third operational amplifier 11, whose other input is grounded. This operational amplifier 11 is provided with a counter-reaction resistor 10. The values of the resistors 8, 9 and 10 are equal. The result is that the output signal of the operational amplifier 11 is:

$$v + RC\,dv/dt.$$

This signal indeed corresponds to the transfer function already quoted:

$$1 + RCp \text{ with } \tau = RC.$$

The output signal of the operational amplifier 11 is applied to one of the inputs of a comparator 12 whose other input receives a reference voltage $V_{REF}$. The output of the comparator 12 allows the decisions to be made. To this end, it is connected to a decision logic 18 which controls, via line 19, the gain of sample amplifier 17.

Figure 2:
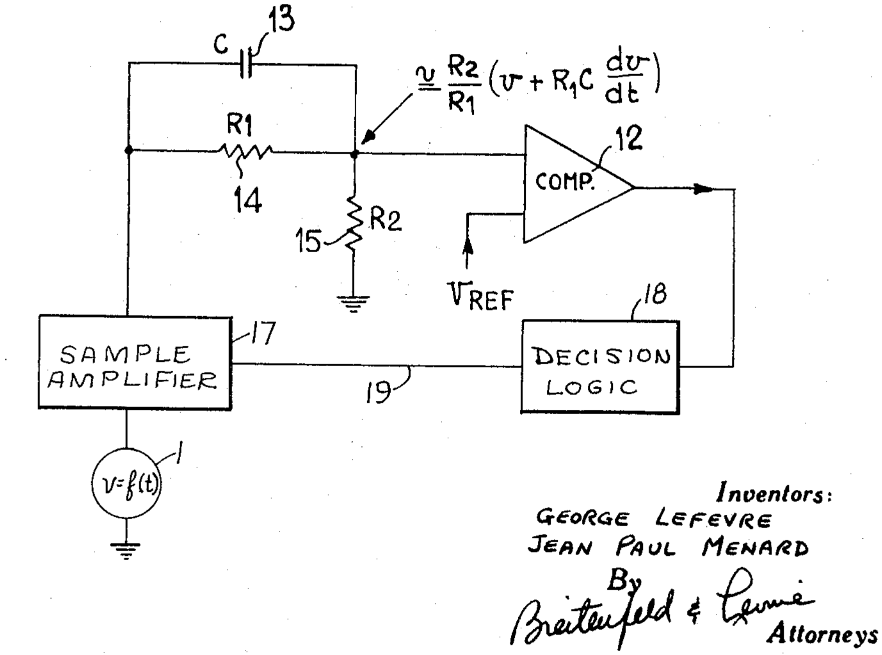
FIG. 2 is an electrical diagrm of another embodiment of a circuit in accordance with the invention.

This circuit is of precise and reliable operation, but necessitates three operational amplifiers for each comparator used upon the processing of the samples. The applicant has perfected a simpler variant comprising only passive elements. This variant is shown in FIG. 2, whose elements common with FIG. 1 bear the same references. These common elements are the generator 1 of sampled signals the sample amplifier 17, the decision logic 18, and the comparator 12, with its reference voltage $V_{REF}$.

In series between the said sample amplifier 17 and the comparison input of the comparator 12 there is arranged a parallel assembly constituted by a capacitor C, of reference 13, and a resistor R1, of reference 14. This same comparison input is connected to earth via a resistor R2, of reference 15.

The voltage present at the common point of the resistors R1 and R2 is substantially:

$$R2/R1\,(v + R1C\,(dv/dt)).$$

This corresponds to a transfer function $$R2/R1\,(1 + R1Cp) \text{ with } \tau = R1C$$

The reference voltage obviously has to be modified in the same ration R2/R1 as the voltage sample.

This transfer function is obtained with precision to the extent that the value R2 of the resistor 15 is much smaller than the value R1 of the resistor 14. Satisfactory results are obtained with the ratio R2/R1 = 1/10 or 1/20.

It will be remembered that the two wirings of FIGS. 1 and 2 which have just been described have respectively the time constants $\tau$= RC and $\tau$ = R1C, and that any wiring allowing such a time constant to be obtained and applied to the samples for a logical processing before storing is a circuit in accordance with the invention.

It must also be observed that, upon the commutations which occur in the course of the logical processing, there occur transitory conditions by virtue of the derivation of the analogue signal. The various phases of the said logical processing therefore have to be implemented after the end of each of these transitory conditions.

There will now be described the application of the circuits in accordance with the invention to the amplifiers of samples having automatic regulation of the amplification factor by discrete values, and which control various types of selection of these amplification factors.

The various known types of such sample amplifiers are described in a U.S. Pat. No. 3,742,489, and titled, Sample Amplifiers Having Automatic Regulation of the Amplification Factor By Discreet Values.

In known embodiments of amplifying systems of this kind, a plurality of amplifying stages of known identical gain, constituting an amplification chain, are used. This amplification chain comprises successive points: the input of the first amplifier, each of the connections from one amplifier to the next, and the output of the final amplifier. These points of the amplification chain, arranged in that order, have voltages of increasing amplitude according to a geometrical progression whose ratio is the gain of one amplifying stage.

The automatic regulation of the amplification factor is effected by selecting the point of the amplification chain at which the voltage is suitable, that is to say generally the nearest one by lower values to an admissible maximum value. This choice is effected by controlled commutation of analogue gates each connected to one of the different points of the amplification chain. These gates are therefore used in a number equal to that of the amplification stages increased by one unit.

In order to obtain the point of the amplification chain where the magnitude of the voltage is suitable for utilization, known amplifiers compare to a reference voltage, simultaneously or successively, the voltages appearing at the different points of the amplification chain. A logical decision circuit receives the result of these comparisons and chooses to actuate the analogue gate corresponding to the point of the amplification chain which has an optimum voltage, or optimum point.

A first family of known devices realises this comparison in a simultaneous manner. The amplifiers of this family comprise one comparator for each analogue gate. The comparison is effected simultaneously at the level of each comparator for the whole of the points of the amplification chain. The result of these simultaneous comparisons is transmitted to the logical decision circuit which determines the optimum point of the amplification chain.

For this first family of amplifiers of samples, the time $\tau$ is chosen to be equal to or greater than the interval of time comprised between the instant when the optimum gain is defined and the instant when the sample is stored, these two instants always being separated by the same time.

A second family of known devices effects the comparison to a reference voltage successively for each point of the amplification chain, in the order of the increasing voltages or, preferably, decreasing ones. This amplifier comprises a single comparator, which is connected successively to the various points of the amplification chain, and a reference voltage. This connection commences preferably by the output of the final stage, going back as far as the input of the first stage. As soon as the result of the comparison changes, the points of comparison is the suitable point. This process necessitates on average a number of successive decisions equal to half the number of points of the amplification chain. Since these decisions take a certain time, a single comparator is used to the detriment of seeking the point having an optimum signal.

For this second family of amplifiers of samples, it is necessary to distinguish two cases.

If the sole comparator proceeds to an exploration of the various factors of amplification in the increasing sense, the first amplification factor used is the smallest one. It is therefore essential to know from the start the value of the amplitude of the sample at the moment of the storing. The is therefore chosen at least equal to the interval of time comprised between the instant of control of the first change in gain and the instant when the sample is stored.

If the sole comparator proceeds to an exploration of the various factors of amplification in the decreasing sense, the first amplification factor used is the largest one. It is therefore essential that the actual value of the sample at the moment of the storing be available at the instant of command of the first change in gain. The time $\tau$ is therefore chosen at least equal to the interval of time comprised between the instant of command of the final change in gain and the instant of storing of the amplified sample.

The third family comprises amplifiers of samples in accordance with the aforesaid Patent titled Sample Amplifiers Having Automatic Regulation of the Amplification Factor By Discreet Values. These amplifiers proceed by successive increase or decrease of the amplification factor. The said increase and decrease result from decisions as a function of the result of two comparisons. They are chosen from among possibilities defined by a predetermined logical diagram according to the total number of amplification factors available in the sample amplifier.

Figure 4:
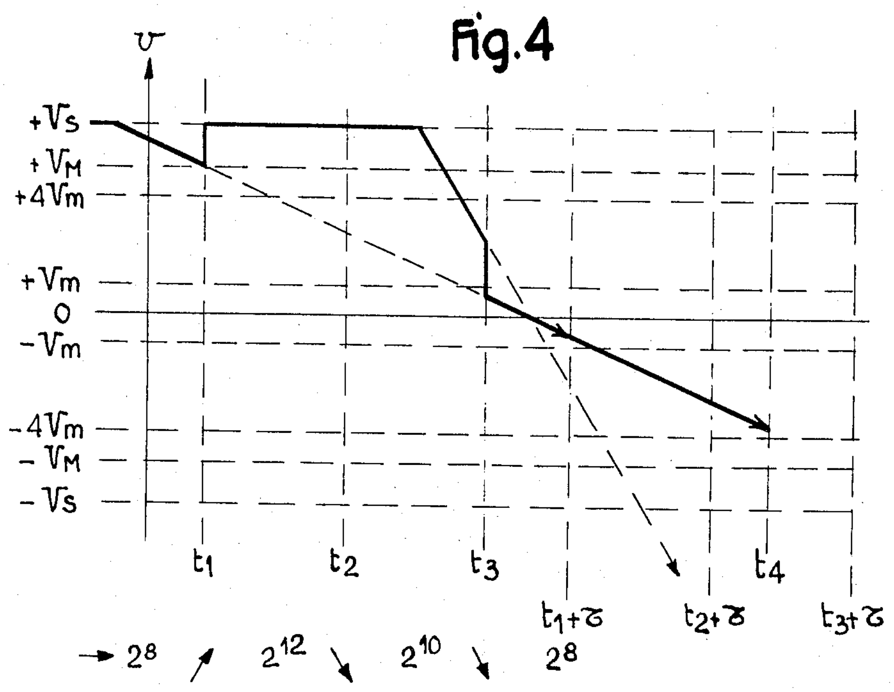

The result is that the choice of the time constant depends on the said logical diagram, that is to say on the number of amplification factors of the said sample. There will be described the implementation of the circuit in accordance with the invention in such a sample amplifier comprising amplification factors varying from $2^0$ to $2^{14}$ according to a geometrical progression of ratio $2^2$. Such a sample amplifier is shown in FIG. 4 of the aforesaid Patent Application.

This particular amplifier first of all makes an initial comparison for the gain $2^8$. According to the result of this comparison, a first decision is capable of making the selections of the points $2^4$, $2^8$ and $2^{12}$. As from one of these points the second and third decisions allow a displacement of one rung of gain, that is to say $2^2$. The amplification factors $2^2$ to $2^{14}$ are accessible after the second decision. The amplification factors $2^0$ to $2^{14}$ are accessible after the third decision.

When the first decision causes the gain to pass from $2^8$ to $2^{12}$, and this value proves to be too large, the gain will be able to be brought back by the following two decisions only to the initial value of $2^8$, by means of a variation of two points of the same direction. It is therefore necessary to choose for the time $\tau$ a value such that, the gain being at least equal to $2^8$ after the third decision, there is no risk of saturation of the measuring device.

Figure 3:
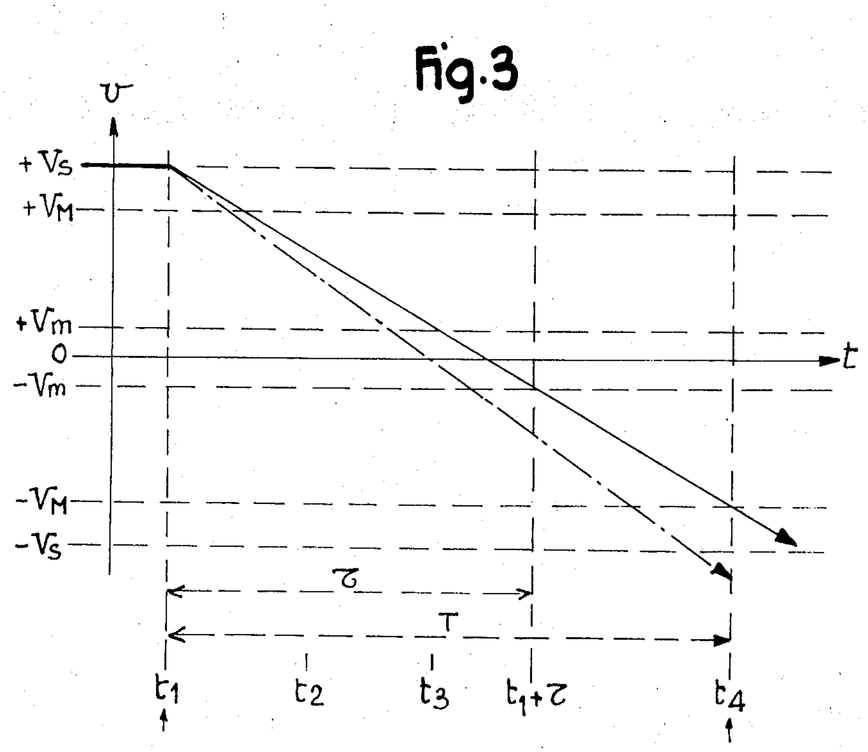
FIGS. 3 and 4 are diagrams of variation of the amplitude of samples as a function of time for a special type of amplifier for samples of variable gain which will be described hereinafter.

The extreme case is shown diagrammatically in FIG. 3. FIGS. 3 and 4 show amplitudes of samples as a function of time. The levels $V_S$ and $-V_S$ are the limits of saturation in output of the amplifiers. The levels $V_M$ and $-V_M$ are the limits of the range of measurement, for example of an analogue to digital converter; finally $V_m$ and $-V_m$ are the minimum thresholds having one and the same absolute value below which an increase in gain is authorised.

In FIG. 3, the evolution of a sample is represented as if the gain were invariable and equal to $2^8$ between the instants $t_1$ of the first decision, and $t_4$ of the storing; $t_2$ and $t_3$ are the instants of the second and third decisions respectively. This extreme case is obtained in the following conditions:

at the instant $t_1$ of the first decision, the magnitude of the sample is $+V_2 - \epsilon$, which condition can allow an increase in the gain, since if this magnitude reached $+V_s$, the slope of the curve would be nil, and the system would commute a lower value of the gain;

at the instant $t_4$ corresponding to the storing, the magnitude of the sample is $-V_M$, which value corresponds to the full negative scale of measurement.

This configuration is that for which the sample has the largest slope which authorises an increase in gain at the instant of the first change in gain and which allows a storing without exceeding the scale of measurement, for certain values of the time $\tau$.

The time $\tau$ will have to be at least equal to the interval of time separating the instant of the first decision from the instant when the magnitude of the sample is equal to $-V_m$. In fact, if the value of $\tau$ is lower than this, an increase in the gain will be able to be decided at the instant $t_1$ of the first change in gain for a sample such as that whose evolution is shown by a mixed line, and which reaches at the instant a value greater than the full scale of negative measurement the gain which it is possible to obtain after the third decision not being able to be less than the gain initially established before the instant $t_1$.

The value $\tau$ can then be deduced from the inequality:

$$v\ (t_4) = V_S - V_S + V_m/\tau\ T \geqslant -V_M$$

in which $T$ is the interval of time $t_4 - t_1$. This inequality expresses the extreme condition for the voltage existing at the instant of the storing to be equal to or less than the full scale of measurement. It stands to reason that this inequality would also be valid for the same variation in the increasing direction. One draws therefrom the following relation of inequality for the time:

$$\tau \geqslant V_S + V_m/V_S + V_M\ T.$$

FIG. 4 gives an example of processing a sample with passage to the gain $2^{12}$ and return to the gain $2^8$ in the case of the particular amplifier which has just been considered. The values $+4V_m$ and $-4\ V_m$, which are represented on the scale of the ordinates of FIG. 4, correspond to the maximum threshold beyond which a decrease in gain is ordered.

It stands to reason that the present invention is not limited either to the applications described in the amplifiers of samples or to the modes of utilization which have been detailed for the various types of amplifiers of samples known to date. It extends in particular to any type of amplifier of samples calling upon comparisons and decisions which bear on the amplitude of the sample, and in a more general manner to any device causing there to occur on samples a logical processing capable of modifying their value according to predefined criteria before their storing.

We claim:

1. A system responsive to periodic pulse samples of an analog signal, comprising:

a variable gain sample amplifier for amplifying the periodic pulse samples;

decision logic means for controlling the gain of the amplifier;

means responsive to the amplitude of each pulse sample at a particular instance of time which is fixed with respect to the leading edge of each pulse sample, for controlling the logic means, said responsive means including an electrical circuit having a transfer function substantially proportional to $1 + \tau p$, p being the Laplace variable and $\tau$ a time constant of the electrical circuit, a reference voltage source, a comparator connected to the electrical circuit and the reference voltage for providing a signal to the logic means to control the gain of the amplifier at a fixed time after each of the particular instances of time, said time constant being at least equal to the fixed time after each of the particular instances of time.

2. A circuit in accordance with claim 1, wherein said circuit comprises a parallel assembly including a capacitor C and a first resistor R1, and a second resistor R2 in series between this parallel assembly and ground, which allows one to obtain at the terminals of the said resistor R2 the transfer function R2/R1 $(1 + R1\ C\ p)$, the time constant $\tau$ being equal to R1 C.

3. A system as defined in claim 1 wherein said electrical circuit includes an inverting operational amplifier; an inverting and differentiating operational amplifier having a time constant $\tau$, the inputs of said operational amplifiers being connected; and a summing-inverter operational amplifier connected to the outputs of the inverting operational amplifier and the inverting and differentiating operational amplifier.

* * * * *